(12) United States Patent
Hattori et al.

(10) Patent No.: US 11,584,211 B2
(45) Date of Patent: Feb. 21, 2023

(54) ELECTRIC VEHICLE

(71) Applicant: Toyota Jidosha Kabushiki Kaisha, Toyota Aichi-ken (JP)

(72) Inventors: Ryo Hattori, Kariya (JP); Yuchi Yamanouchi, Toyota (JP); Masaki Shitara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 16/906,567

(22) Filed: Jun. 19, 2020

(65) Prior Publication Data

US 2020/0406736 A1    Dec. 31, 2020

(30) Foreign Application Priority Data

Jun. 28, 2019    (JP) .............................. JP2019-121198

(51) Int. Cl.
| | |
|---|---|
| *B60K 1/04* | (2019.01) |
| *B60G 11/30* | (2006.01) |
| *B60L 50/60* | (2019.01) |
| *B60G 11/27* | (2006.01) |
| *B60N 2/68* | (2006.01) |
| *F15B 1/04* | (2006.01) |
| *B60N 2/24* | (2006.01) |

(52) U.S. Cl.
CPC ................ *B60K 1/04* (2013.01); *B60G 11/27* (2013.01); *B60G 11/30* (2013.01); *B60L 50/66* (2019.02); *B60N 2/68* (2013.01); *B60G 2202/152* (2013.01); *B60G 2202/412* (2013.01); *B60G 2300/14* (2013.01); *B60G 2300/50* (2013.01); *B60K 2001/0438* (2013.01); *B60N 2/242* (2013.01); *F15B 1/04* (2013.01)

(58) Field of Classification Search
CPC .... B60K 1/04; B60K 2001/0438; B60N 2/68; B60G 11/27; B60G 11/30; B60G 2202/152; B60G 2202/412; B60G 2300/14; B60G 2300/50
See application file for complete search history.

(56) References Cited

U.S. PATENT DOCUMENTS

| | | | | |
|---|---|---|---|---|
| 3,874,692 A | * | 4/1975 | Ono .................. | B60G 17/0155 280/124.16 |
| 5,392,873 A | * | 2/1995 | Masuyama ......... | H01M 10/613 180/68.5 |

(Continued)

FOREIGN PATENT DOCUMENTS

| JP | H05050827 A | 3/1993 |
|---|---|---|
| JP | 2004-127747 A | 4/2004 |

(Continued)

*Primary Examiner* — Frank B Vanaman
(74) *Attorney, Agent, or Firm* — Dinsmore & Shohl LLP

(57) ABSTRACT

An electric vehicle comprises: a main battery which is disposed under the floor of a vehicle interior; a front seat which is provided for a front part of the vehicle interior; a front housing chamber which is formed under a seating surface of the front seat; and an air-suspension device including an air spring which is made to expand and contract by air pressure, an air compressor which compresses air, and one or more first surge tanks which store high-pressure air or low-pressure air, in which the first surge tanks and the air compressor are disposed in a front housing chamber.

7 Claims, 8 Drawing Sheets

(56) References Cited

U.S. PATENT DOCUMENTS

| | | | | |
|---|---|---|---|---|
| 5,921,578 | A * | 7/1999 | Sekita | B60K 1/04 |
| | | | | 296/203.02 |
| 8,069,884 | B1 * | 12/2011 | Gray-Woods | F16N 19/00 |
| | | | | 239/69 |
| 8,444,161 | B2 * | 5/2013 | LeClerc | B60G 11/27 |
| | | | | 180/311 |
| 8,453,773 | B2 | 6/2013 | Hill et al. | |
| 8,720,636 | B2 * | 5/2014 | Akoum | H01M 50/20 |
| | | | | 180/68.5 |
| 2006/0102398 | A1 | 5/2006 | Mizuno | |
| 2013/0000997 | A1 | 1/2013 | Peng et al. | |
| 2017/0197667 | A1 | 7/2017 | Kabayama | |
| 2018/0237076 | A1 * | 8/2018 | Perlo | B60K 1/02 |
| 2018/0345777 | A1 * | 12/2018 | Birnschein | B60W 10/20 |

FOREIGN PATENT DOCUMENTS

| | | |
|---|---|---|
| JP | 2013-136266 A | 7/2013 |
| JP | 2017-124657 A | 7/2017 |

* cited by examiner

ELECTRIC VEHICLE

CROSS REFERENCE TO RELATED APPLICATION

This application claims priority to Japanese Patent Application No. 2019-121198 filed on Jun. 28, 2019, which is incorporated herein by reference in its entirety including the specification, claims, drawings, and abstract.

TECHNICAL FIELD

In the present specification, an electric vehicle having an air-suspension device and a main battery is disclosed.

BACKGROUND

Conventionally, there has been known a vehicle having an air-suspension device as a suspension device mounted therein. The air-suspension device uses an air spring as a suspension spring, and has an air compressor for generating compressed air, and a surge tank which stores high-pressure air or low-pressure air and the like other than the air spring.

JP2017-124657 A discloses a vehicle having an air-suspension device mounted therein, in which an air compressor is disposed under a rear floor, and a surge tank is disposed in a rear wheel house. By disposing the air compressor under the rear floor in this manner, a space under the floor of the vehicle can be effectively utilized.

However, an upper face of the rear wheel house is normally curved. Disposing a simple-shaped surge tank of a rectangular parallelepiped or the like in such a rear wheel house creates a larger dead space, and worsens space efficiency. On the other hand, in the case where the shape of the surge tank is curved for the upper face of the rear wheel house in order to increase space efficiency, a manufacturing cost of the surge tank increases.

Further, in recent years, electric vehicles having a motor mounted therein as a traveling power source have been spreading. In such electric vehicles, a main battery which accumulates power to be supplied to the motor is mounted. Because the main battery is normally larger than a travel-use motor or an air compressor, and takes up space, the battery is disposed under the floor in many cases. In the case where the main battery is disposed under the floor, an empty space under the floor becomes scarce, and there were cases where the air compressor of the air-suspension device could not be disposed under the floor as in JP2017-124657 A. Then, it is also possible to widen a power unit chamber in which the travel-use motor is disposed, and dispose the air compressor or the surge tank in the power unit chamber, but in the case of spreading the power unit chamber more than needed, a vehicle interior space becomes narrower for the spread amount.

Then, this description discloses an electric vehicle in which a wide vehicle interior can be secured while the air-suspension device and the main battery are mounted.

SUMMARY

The electric vehicle disclosed in this description is characterized by comprising: a main battery disposed under the floor of a vehicle interior; a seat provided for a front part or a rear part of the vehicle interior; a first housing chamber formed under a seating surface of said seat; and an air-suspension device including the air springs that are expanded and contracted by air pressure, an air compressor which compresses air, and one or more first surge tanks which store high-pressure air or low-pressure air, in which at least one of said first surge tanks and said air compressor is disposed in said first housing chamber.

As described above, even with an electric vehicle in which a large main battery is disposed under the floor, and which has a small empty space under the floor, by housing at least one of the first surge tanks and the air compressor into the first housing chamber under the seating surface lower side of the seat, there is no need to wastefully reduce a vehicle interior space, and a wide vehicle interior can be secured.

Further, the vehicle may comprise a second housing chamber which is provided on the opposite side of said first housing chamber in a front/rear direction of vehicle, and in which a motor unit including a travel-use motor and a PCU is disposed.

By disposing the motor unit being a heavy object on the opposite side of the air compressor or the first surge tank in a front/rear direction of the vehicle, a front/rear weight balance of the vehicle is stabilized.

In this case, the vehicle may further comprise a brake driving device which drives a brake by hydraulic pressure, and disposed in said first housing chamber.

By further disposing the brake driving device, being a heavy object, in the first housing chamber together with the air compressor or the first surge tanks of air-suspension device, a weight balance with the second housing chamber in which the motor unit is disposed is even better stabilized.

Further, one or more of said first surge tanks and said air compressor may be disposed in an array inside said first housing chamber in a vertical direction of the vehicle.

In the case where the height dimension of the air compressor is smaller compared with the height dimension of the first housing chamber a space above or under the air compressor can be effectively used, by disposing the first surge tank on an upper side or a lower side of the air compressor.

In this case, said air compressor may be disposed under one or more of said first surge tanks.

By disposing the air compressor, being a heavy object, under the first surge tanks, center of gravity of the vehicle can be lowered, and the vehicle can be even better stabilized.

Further, two or more of said first surge tanks may be disposed in an array in said first housing chamber in a vertical direction of vehicle.

In the case where a surge tank having a large and specific shape is provided corresponding to the shape of an empty space, a manufacturing cost of the surge tanks rises. As described above, with a constitution in which a plurality of existing surge tanks are disposed in a vertically layered manner for the size of an empty space, a surge tank of a specific shape becomes unnecessary, so that sufficient volume of air can be stored at a low cost.

Further, said air-suspension device further may include said second surge tank, and said second surge tank may be disposed between said first housing chamber and said main battery under the floor of said vehicle interior.

By further disposing the second surge tank in a dead space between the first surge tanks and the main battery, waste of a space can be omitted and a wide vehicle interior can be secured.

Furthermore, the vehicle is further equipped with a seat frame supporting said seat, an outer end part of said seat frame in a vehicle front/rear direction is positioned outside both said first surge tanks and said air compressor in the vehicle front/rear direction, and said seat frame may be overlapped with said first surge tank and said air compressor in a vehicle width direction.

With such a constitution, at the time of collision from a front/rear of the vehicle, collision load is input to the seat frame earlier than the first surge tanks and the air compressor. In this way, the first surge tanks and the air compressor can be protected at the time of collision.

According to an electric vehicle disclosed in this specification, a wide vehicle interior can be secured while mounting an air-suspension device and a main battery.

BRIEF DESCRIPTION OF DRAWINGS

Embodiment(s) of the present disclosure will be described based on the following figures, wherein.

DESCRIPTION OF EMBODIMENTS

Figure 1:
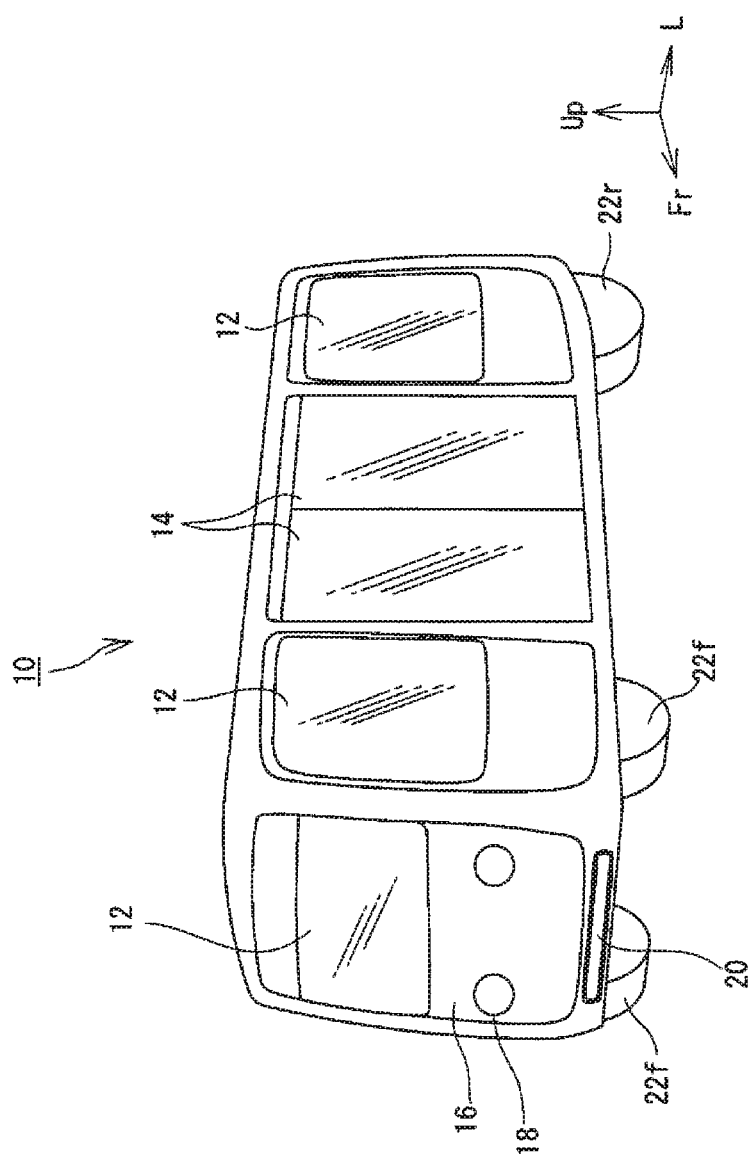
FIG. 1 is a perspective view of an electric vehicle seen from outside.

A constitution of a vehicle 10 will be explained below referring to the drawings. It should be noted that in each figure referred to below, "Fr", "Up" and "L" respectively show a vehicle front direction, a vehicle upper direction, and a left side in a vehicle width direction.

Figure 2:
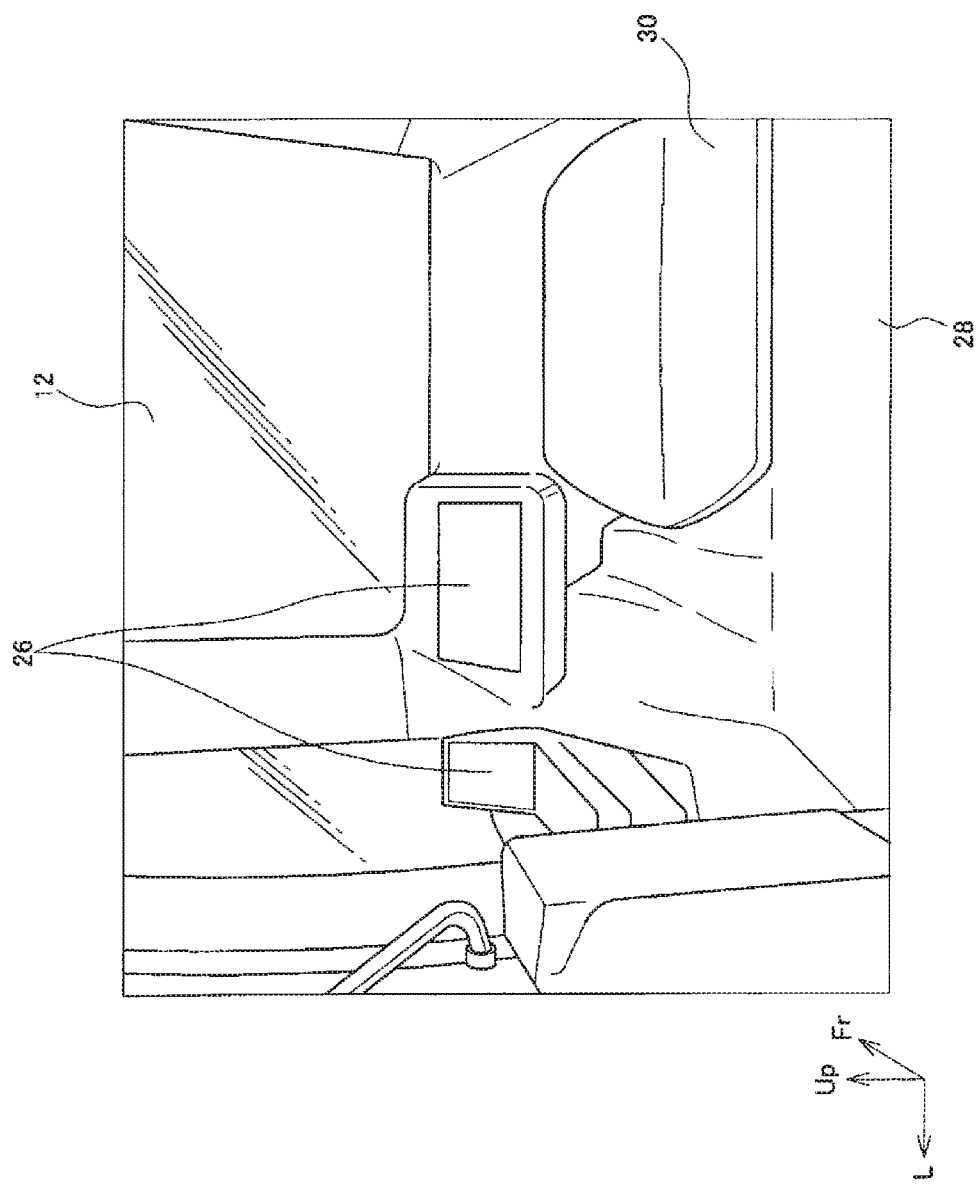
FIG. 2 is a perspective view in which a front area of a vehicle interior is seen from the center of the vehicle interior.
Figure 3:
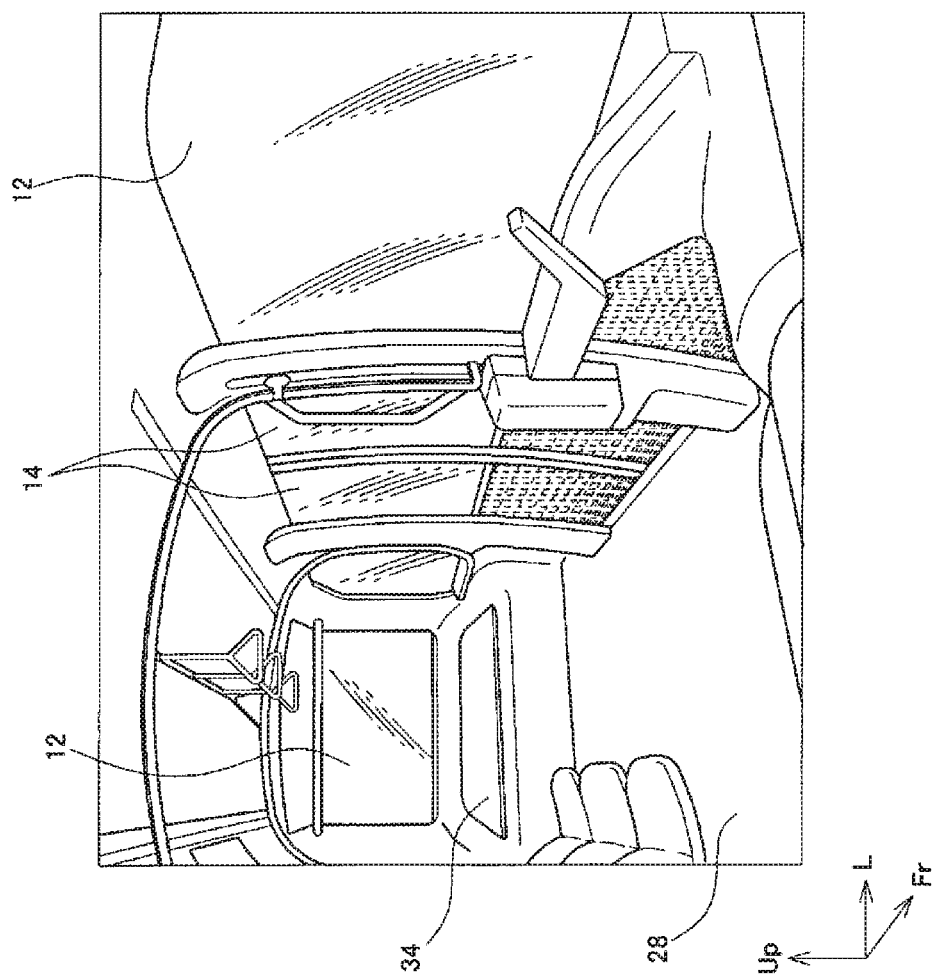
FIG. 3 is a perspective view in which a rear area of a vehicle interior is seen from a vehicle front part.
Figure 4:
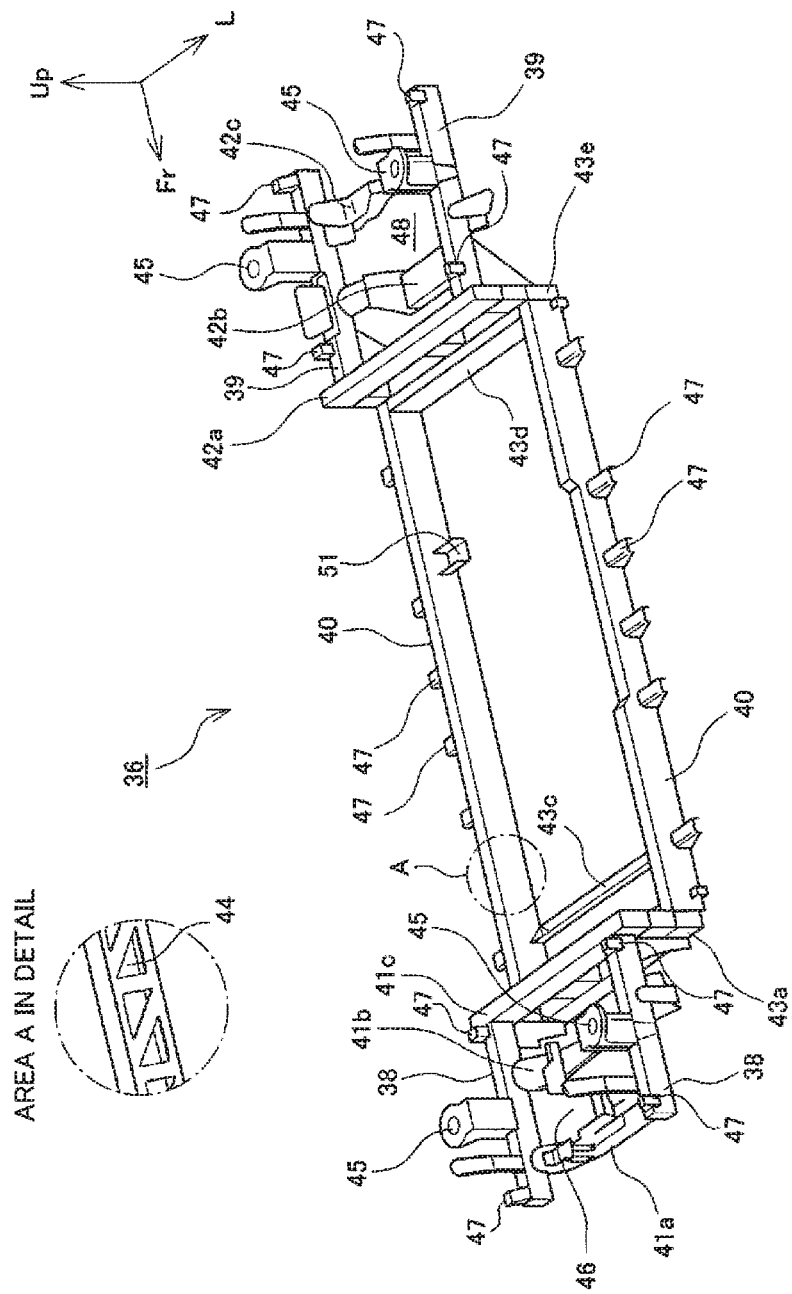
FIG. 4 is a perspective view of a main frame.

Firstly, the entire constitution of the vehicle 10 will be briefly explained referring to FIG. 1 to FIG. 4. FIG. 1 is a perspective view of the vehicle 10 seen from outside. Further, FIG. 2 is a perspective view of a front area of a vehicle interior seen from the center of a vehicle interior, FIG. 3 is a perspective view of a rear area of the vehicle interior seen from a vehicle front part. Furthermore, FIG. 4 is a perspective view of a main frame 36 of the vehicle 10.

The vehicle 10 is used as a bus which transports passengers while traveling along a determined route in a specific premises by automated drive. However, a usage mode of the vehicle 10 disclosed in this specification is appropriately changeable, and the vehicle 10 can be used as a mobile business space for example. For example, the vehicle 10 may be used as a store such as a retail store which displays and sells various goods, a restaurant in which food/drink are cooked and provided. Further, as another mode, the vehicle 10 may be used as an office for performing clerical work or meeting with a customer or the like. Further, the vehicle 10 may be used as a transportation vehicle such as a taxi and a bus which transports customer or luggage. Further, a usage situation of the vehicle 10 is not limited to business, and the vehicle 10 may be used as individual moving vehicle for example. Further, a traveling pattern or a traveling speed of the vehicle 10 may be also changed appropriately.

The vehicle 10 is an electric automobile having a travel-use motor 74 as a prime mover (refer to FIG. 6), and a main battery 50 for supplying power to the travel-use motor 74 is mounted under the floor of the vehicle 10. The vehicle 10 does not have a hood and a trunk as shown in FIG. 1, and has an external appearance of a substantially rectangular parallelepiped in which a front end face and a rear end face rise approximately vertically. A pair of front wheels 22f and a pair of rear wheels 22r are provided respectively in the vicinity of a rear end and the vicinity of a front end of the vehicle 10. Large window parts 12 are provided on side faces of the vehicle 10. Further, at the center on left side face of the vehicle 10, a door 14 of a double-door sliding type which slides in a front/rear direction of the vehicle and opens/closes is provided.

A window part 12 which functions as a windshield and a lamp disposing part 16 arranged on a lower side of the window part 12 are provided at a front end face of the vehicle 10. Signaling lamps 18 for notifying a person outside a vehicle of existence and behavior of an automobile using light are disposed in the lamp disposing part 16. A grille 20 for leading external air into the vehicle is provided at a bottom end of the lamp disposing part 16. A rear end face of the vehicle 10 has substantially the same constitution as the front end face of the vehicle, in which the window part 12 and the lamp disposing part 16 are arrayed vertically, and the grille 20 is disposed at a bottom end of the lamp disposing part 16. Therefore, the vehicle 10 of this example has a substantially front/rear symmetrical external appearance.

As shown in FIG. 2, operation panels 26 which receive an instruction from an operator are provided in a vehicle interior front part of the vehicle 10. Further, a front part of a floor panel 28 bulges upward, and constitutes a front seat 30 on which a crew member can be seated toward a vehicle rear direction. Similarly, as shown FIG. 3, a rear part of the floor panel 28 bulges so as to constitute a rear seat 34 on which a crew member can be seated toward a vehicle front direction. Housing chambers 46, 48 partitioned from the vehicle interior exist under the front seat 30 and the rear seat 34, that is, at a front lower part and a rear lower part of the vehicle 10, and will be described later.

The vehicle 10 of this example is in a body-on-frame structure in which a box-shaped body is assembled on a ladder-shaped main frame 36 as shown in FIG. 4. A front part of the main frame 36 is constituted by a pair of front side members 38 extending in a front/rear direction of the vehicle and a plurality of front cross members 41a, 41b, 41c connecting the pair of front side members 38. Further, suspension towers 45 for attaching air-suspensions (not shown in FIG. 4) are erected from an upper face of the front side member 38.

The rear part of the main frame 36 is also constituted by a pair of rear side members 39 extending in a front/rear direction of the vehicle and a plurality of rear cross members 42a, 42b, 42c connecting the pair of rear side members 39 similarly to the front part. The suspension towers 45 for attaching the air-suspensions are erected from an upper face of the rear side members 39.

A pair of center side members 40 extending in a front/rear direction of the vehicle and a plurality of center cross members 43a, 43b (cannot be seen in FIG. 4), 43c, 43d, 43e connecting the pair of center side members 40 are provided on the central part of the main frame 36. Two center cross members 43a, 43b connect front ends of the pair of center side members 40, two center cross members 43d, 43e connect rear ends of the pair of center side members 40. Further, the center cross member 43c for supporting the main battery 50 is provided between the center cross member 43b and the center cross member 43d.

Now, as it is clear FIG. 4, the front side member 38 and the rear side members 39 are positioned above the center side member 40. The front seat 30 is disposed on an upper side of the front side member 38, and the rear seat 34 is disposed on an upper side of the rear side members 39. A space under the front seat 30 functions as a front housing chamber 46 housing an air compressor 58 of an air-suspension device 52 which will be described later, and the like. Further, a space under the rear seat 34 functions as a rear housing chamber 48 housing a motor unit 72 such as the travel-use motor 74. The front housing chamber 46 functions as a first housing chamber in which the compressor of the air-suspension device, and the like are housed, and the rear housing chamber 48 functions as a second housing chamber in which the motor unit or the like is housed, and will be described later.

Cross members and side members excluding the center cross member 43c are rectangular piped members having a rectangular cross-section. Further, although FIG. 4 shows all the side members and cross members in a simplified manner, through-holes 44 (triangular holes in the example shown) are formed on their side faces or upper/lower surfaces as shown in detail in part A of FIG. 4. By forming such through-holes 44, the weight of the main frame 36 can be drastically reduced. Further, by forming the through-holes 44, a part of wires or piping can be inserted into a rectangular piped side member or cross member via the through-holes 44.

A prime mover, a power-transmitting device, a brake device, a traveling device, a suspension device, a steering device, electric devices and the like are assembled in the above-described main frame 36 to constitute a chassis. It should be noted that the air-suspension device 52 is mounted as a suspension device in this example, and will be described later referring to FIG. 5. A box-shaped body is assembled on the main frame 36. On an outer face of each side member 38, 39, 40, a plurality of cab mounting brackets 47 for mounting and fixing the body are formed in a protruded manner.

Figure 5:
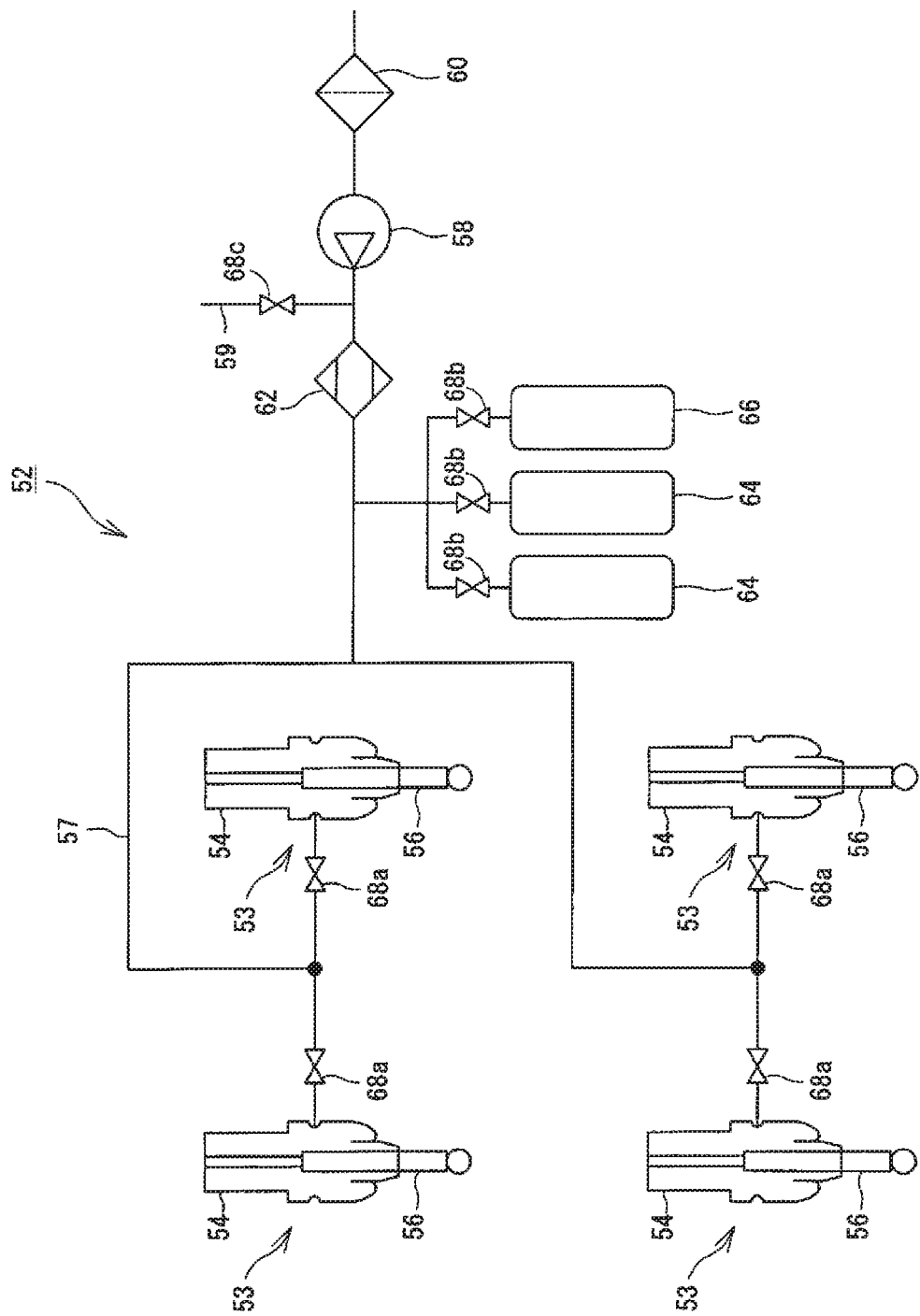
FIG. 5 is a view showing a constitution of an air-suspension device.

Next, a constitution of the air-suspension device 52 mounted on the vehicle 10 will be explained while referring to FIG. 5. FIG. 5 is a view showing a schematic constitution of the air-suspension device 52. The air-suspension device 52 is equipped with four suspension units 53 which are severally attached to the four suspension towers 45. Each suspension unit 53 is constituted by combining an air spring 54 and a shock absorber 56. Each air spring 54 is connected to an air piping 57 via an electromagnetic valve 68a. Further, pressure inside the air spring 54 is detected by a pressure sensor (not shown), and sent to an electronic control unit mounted on the vehicle 10 (hereinafter referred to as "ECU").

A filter 60, the air compressor 58 and a drier 62 are provided at an upstream side of the air piping 57. The air compressor 58 compresses external air, and sends the air to the air spring 54 or first and second surge tanks 64, 66. The filter 60 removes foreign objects from external air and sucked in by the air compressor 58. The drier 62 has a desiccant such as silica gel, and removes moisture from compressed air output from the air compressor 58. Furthermore, discharge piping 59 for emitting air emitted from the air spring 54 to the outside is connected between the air compressor 58 and the drier 62. An electromagnetic valve 68c is provided in the discharge piping 59.

The first surge tank 64 and the second surge tank 66 are further connected between the drier 62 and the air spring 54 via an electromagnetic valve 68b. Both the first and second surge tanks 64, 66 are tanks storing high-pressure air. As described later in detail, although installation positions of the first surge tank 64 and the second surge tank 66 are different, their constitutions are the same. Pressure inside the surge tanks 64, 66 is also detected by a pressure sensor, and sent to the ECU.

The ECU controls a spring constant and a damping force of the suspension unit 53 by supplying air to the air spring 54 or by emitting air from the air spring 54. Specifically, the ECU previously drives the air compressor 58 in the state where the electromagnetic valves 68a, 68c are closed, and the electromagnetic valve 68b is released, and previously stores high-pressure air in the surge tanks 64, 66. In the case of supplying air to the air spring 54, the ECU opens the electromagnetic valves 68a, 68b. In this way, high-pressure air is supplied from the surge tanks 64, 66 to the air spring 54. Further, in the case of emitting air from the air spring 54, the ECU opens the electromagnetic valves 68a, 68c, and closes the electromagnetic valve 68b. In this way, air inside the air spring 54 is emitted from the discharge piping 59 to the outside via the drier 62. At this time, desiccant in the drier 62 is regenerated by allowing dried air inside the air spring 54 to pass through the drier 62.

Among the above-described constituent elements of the air-suspension device 52, the suspension unit 53 is attached on a lower side of the suspension tower 45. Further, because the filter 60, the drier 62 and the electromagnetic valves 68a to 68c are relatively small, they are appropriately disposed in an empty space. On the other hand, because the air compressor 58 and the surge tanks 64, 66 are relatively large-sized components, they are disposed taking a balance with the main battery 50, the travel-use motor 74 and the like in consideration. An arrangement of primary components including the air compressor 58 and the surge tanks 64, 66 will be explained below referring to FIG. 6 to FIG. 8.

Figure 6:
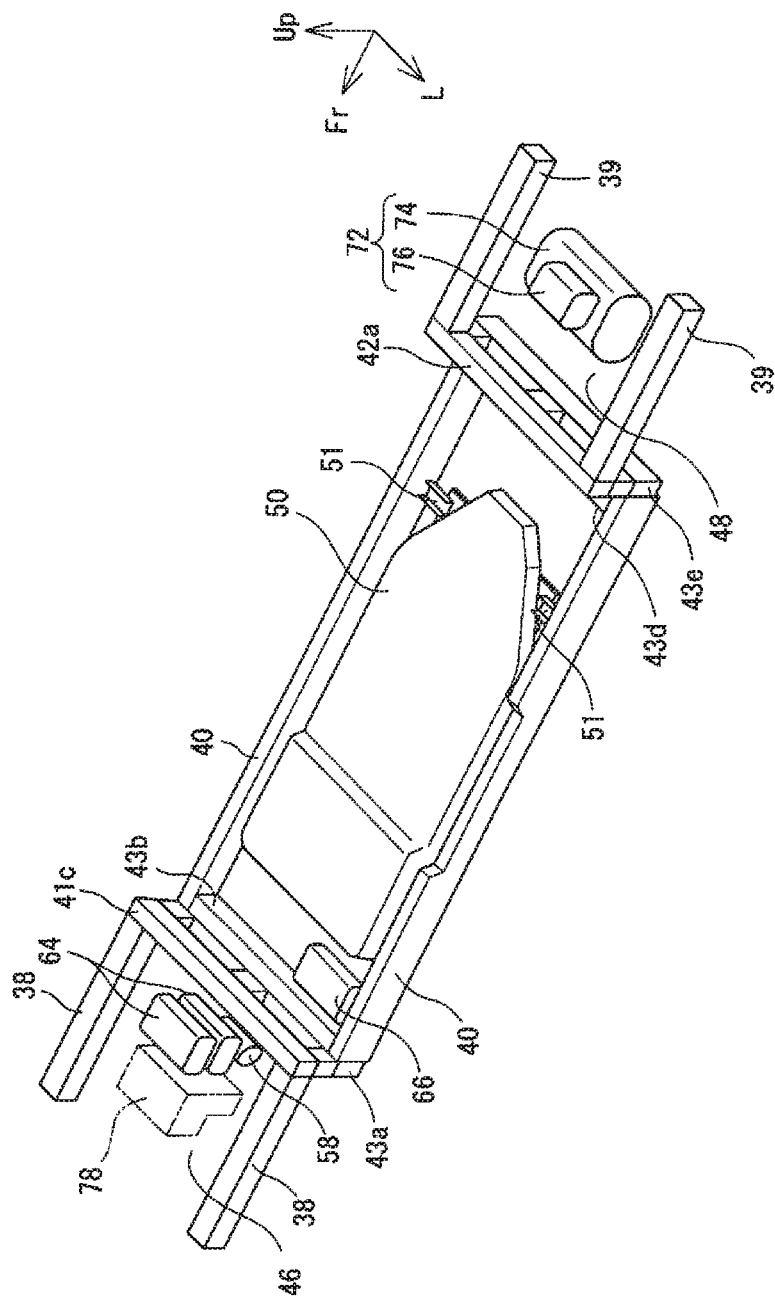
FIG. 6 is a schematic perspective view of an arrangement of primary components.
Figure 7:
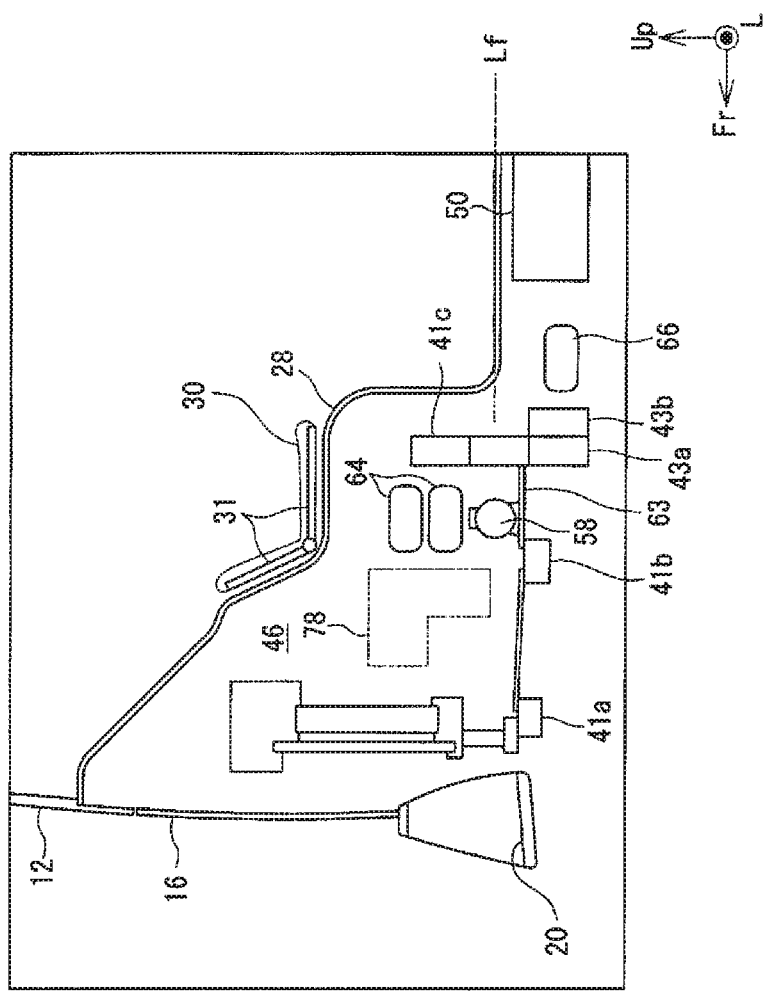
FIG. 7 is a schematic cross-sectional view of a front housing chamber.
Figure 8:
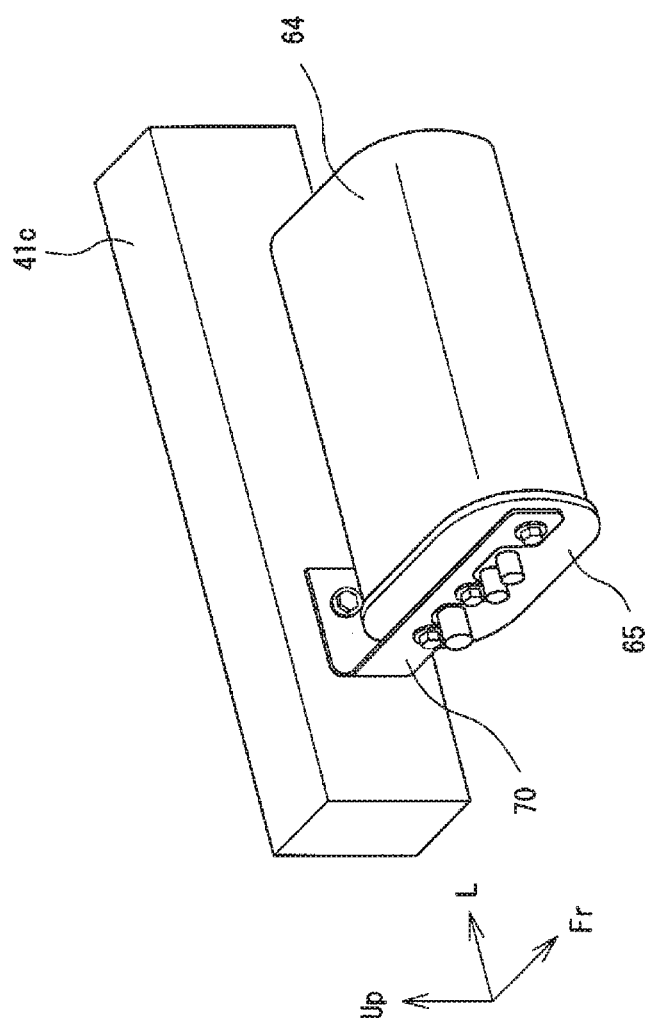
FIG. 8 is a perspective view showing how a first surge tank is attached.

FIG. 6 is a schematic perspective view of an area under a vehicle showing an arrangement of primary components. Further, FIG. 7 is a schematic cross-sectional view around the front housing chamber 46, FIG. 8 is a perspective view showing how the first surge tank 64 is attached. As described above and as shown in FIG. 6, in this example, the main battery 50 is disposed under the floor at the center of a vehicle interior part and between the pair of center side members 40. The main battery 50 has a flattened shape, and has a size occupying a major part of an under-floor space surrounded by the center side members 40 and the center cross members 43b, 43d. A front end of the main battery 50 is mounted, screwed and fastened on the center cross member 43c (refer to FIG. 4) of an L-shaped cross-section. Further, a pair of support brackets 51 hold the main battery 50 in a suspended manner.

Further, as described above, the rear housing chamber 48 is formed under the rear seat 34. The motor unit 72 including the travel-use motor 74 and a power control unit 76 (hereinafter referred to as "PCU 76") is disposed in the rear housing chamber 48.

The front housing chamber 46 is formed under the front seat 30, that is, on the opposite side in a front/rear direction of the vehicle to the aforementioned rear housing chamber 48. The front housing chamber 46 is a space under the front seat 30 as is clear from FIG. 7. A bottom surface of the front housing chamber 46 is lower than the floor surface level Lf of the vehicle interior, and an upper face of the front housing chamber 46 is higher than the floor surface level Lf of the vehicle interior. In this example, the air compressor 58 and the two first surge tanks 64 are disposed in the front housing chamber 46, and the second surge tank 66 is disposed between the front housing chamber 46 and the main battery 50.

Specifically, the air compressor and the surge tanks of the air-suspension device have conventionally been disposed under the floor in many cases, but the flattened and large-sized main battery 50 is disposed under the floor in this example. Therefore, an empty space of the under-floor space is limited, and it was difficult to dispose all of the air compressor 58 and the three surge tanks 64, 66. On the other hand, in this example, the front seat 30 and the rear seat 34 of a bench type are provided for the front part and the rear part of the vehicle interior. By disposing the air compressor 58 and the first surge tanks 64 under the front seat 30, the air compressor 58 and the like can be disposed without wastefully limiting the vehicle interior space, and space efficiency improves.

Explaining more specifically, in this example, the air compressor 58 and the two first surge tanks 64 are disposed in a vertically arrayed manner inside the front housing chamber 46 as shown in FIG. 7. Existing items are diverted into both the air compressor 58 and the first surge tanks 64, and the air compressor 58 is attached to a fixing member in a posture having a longitudinal direction that is horizontal. Further, the first surge tank 64 is a cylindrical member in which a lid body 65 is attached to one end face in its longitudinal direction as shown in FIG. 8. In this example, the first surge tank 64 is disposed above the air compressor 58 in a posture having a longitudinal direction that is horizontal.

The air compressor 58 is fixed to a support member 63 which is fixed to center cross member 43*a* or the like. Further, the first surge tank 64 is fixed to a fixing member such as the front cross member 41*c* via a bracket 70 attached to the lid body 65. The bracket 70 is in an approximately L-shape in a planar view, one end of the bracket 70 is screwed and fastened to the lid body 65, and the other end is screwed and fastened to a fixing member such as the front cross member 41.

The second surge tank 66 is disposed for a left-front corner part of the under-floor space, that is, between the front housing chamber 46 and the main battery 50. The second surge tank 66 has a shape and a structure similar to the first surge tank 64, and the only different point is where it is disposed. The second surge tank 66, similarly to the first surge tank 64, is fixed to a fixing member such as the center cross member 43*b* via the bracket 70 attached to the lid body 65.

Herein, the height dimension of the air compressor 58 is normally sufficiently smaller than the height dimension of the front housing chamber 46 (space under the front seat 30) in many cases. Therefore, in the case where the air compressor 58 is disposed in the front housing chamber 46, an empty space is easily generated above or under the air compressor 58. In this example, by disposing the first surge tanks 64 above the air compressor 58 which is the empty space, the empty space can be effectively used, and space efficiency of the vehicle 10 can be improved. It should be noted that in this example the air compressor 58 is disposed under the first surge tanks 64 as shown in FIG. 7. By disposing the air compressor 58, being a heavy object, under the tanks, the center of gravity of the vehicle 10 can be lowered, and the stability of the vehicle 10 can be improved.

Further, in this example, an air storage capacity is secured by increasing the number of the surge tanks instead of increasing the size of the surge tank. With such a constitution, sufficient storage capacity can be secured while using existing surge tanks, and a cost required for the surge tanks can be reduced. On the other hand, in order to secure air storage capacity, increasing the size of a single surge tank is also possible. For example, instead of providing three surge tanks having a capacity of M liters, providing a single surge tank having 3×M liters is also possible. However, in this case, a surge tank of a specific shape must be manufactured again, which causes increase in cost. By comparison, this example uses the surge tanks 64, 66 of an existing shape. Because each of the surge tanks 64, 66 is a mass-produced product and inexpensive, a cost required for surge tanks can be suppressed.

Further, when the size of a single surge tank is large, a substantial large space is necessary for disposing the surge tank. However, in an electric vehicle mounting the large main battery 50, there were many cases where further securing a disposing space for a large surge tank in addition to a disposing space for the large main battery 50 had been difficult. On the other hand, when a plurality of the relatively small-sized surge tanks 64, 66 are used, as in this example, surge tanks can be disposed in a dispersed manner, so that sufficient storage capacity of air can be secured even if there is no substantial empty space. For example, in this example, because the front housing chamber 46 has an empty space only for the two first surge tanks 64, the second surge tank 66 is disposed in an under-floor space outside the front housing chamber 46. In this way, sufficient storage capacity of air can be secured even if there is no substantial large empty space.

Further, as is clear in the above-described explanation, in this example, the air compressor 58 is disposed in a space (the front housing chamber 46) on the opposite side in a front/rear direction of vehicle of the rear housing chamber 48 in which the motor unit 72 is disposed. By disposing the air compressor 58 being a heavy object on the opposite side of the motor unit 72 or the like being the heavy object, a front/rear weight balance of the vehicle 10 is stabilized.

Furthermore, in this example, a brake driving device 78 is also disposed in the front housing chamber 46 as shown in FIG. 6 and FIG. 7. It should be noted that only a rough external shape of the brake driving device 78 is expressed by a double dot chain line in FIG. 6 and FIG. 7. The brake driving device 78 is a device that supplies hydraulic pressure to a brake attached to a wheel to drive the brake. The brake driving device 78 has one or more brake actuators which supply hydraulic pressure to the brake. The brake actuator may be a non-pressure accumulation-type actuator which pressure-feeds operating liquid to the brake as needed, or may be an accumulation-type actuator which brings operating liquid to a high-pressure state in advance to store pressure. In the case of the non-pressure accumulation-type actuator, a reservoir which stores operating liquid, a motor which pressure-feeds operating liquid, and the like are included, for example. In the case of the pressure accumulation-type actuator, a reservoir which stores operating liquid, a motor which pressure-feeds operating liquid, an accumulator which stores operating liquid at a high-pressure state, a master cylinder to which operating liquid is sent, and the like are included, for example.

In this example, such a brake driving device 78 is disposed inside the front housing chamber 46 and in front of the first surge tank 64 and the air compressor 58. By further disposing the brake driving device 78 being a heavy object in the front housing chamber 46 in addition to the air compressor 58 in this manner, a weight balance with the motor unit 72 disposed in a rear area of the vehicle is even better stabilized.

Herein, as shown in FIG. 7, the front seat 30 is supported by a seat frame 31. The seat frame 31 is normally constituted of a rigid body made of metal or the like, and has high strength. In this example, a front end of the seat frame 31 (outer end part in vehicle front/rear direction) is designed to be ahead (outside in vehicle front/rear direction) of a front end of the first surge tank 64 and the air compressor 58. Further, the seat frame 31 is designed to be overlapped with the first surge tank 64 and the air compressor 58 in a vehicle width direction. With such an arrangement, collision load generated at the time of frontal collision is received by the robust seat frame 31 before being input to the first surge tank 64 and the air compressor 58. As a result, the collision load input to the first surge tanks 64 and the air compressor 58 can be reduced, and the first surge tanks 64 and the air compressor 58 can be protected.

As is clear in the explanation made above, in this example, the air compressor 58 of the air-suspension device 52 and the first surge tanks 64 are disposed in the front housing chamber 46 being a space under the front seat 30. With such a constitution, the space under the seat can be effectively used. Then, because there is no need to wastefully reduce a vehicle interior due to this constitution, a wide vehicle interior can be secured. It should be noted that the above-explained constitution is only an example, and as long as at least one of the first surge tanks 64 and the air compressor 58 is disposed in the space under the seat, other constitutions may be changed. For example, a constitution in which only either one of the air compressor 58 and the first surge tanks 64 is disposed in the housing chamber under the seat may be acceptable. Further, the number of the first surge tanks 64 and the second surge tank 66 may be changed appropriately corresponding to required storage capacity of air. Therefore, if a sufficient empty space is in the housing chamber under the seat, the number of the first surge tanks 64 disposed in the housing chamber may be three or more. Further, if storage capacity of air is sufficiently secured, the second surge tank 66 disposed in the under-floor space may be unnecessary.

Further, functions of the three surge tanks 64, 66 are the same in this example, but the three surge tanks 64, 66 may have different functions from each other. For example, while a part of the first surge tank 64 and the second surge tank 66 stores high-pressure air, remaining surge tanks may store low-pressure air. In this case, when the electromagnetic valves 68a, 68b are opened in emitting air from the air spring 54 such that the air spring 54 and the surge tanks storing low-pressure air communicate with each other, air can be quickly emitted. Further, a part of the first surge tanks 64 and the second surge tank 66 may be used as surge tanks for front wheels, and a remaining surge tank may be used as a surge tank for rear wheels.

Further, the air compressor 58 or the like may be disposed not in the front housing chamber 46 under the front seat 30, but in the rear housing chamber 48 under the rear seat 34. In this case, the motor unit 72 may be disposed in the rear housing chamber 48 or may be disposed in the front housing chamber 46 together with the air compressor 58 or the like.

REFERENCE SIGNS LIST

10 Vehicle, 12 Window part, 14 Door, 16 Lamp disposing part, 18 Signaling lamp, 20 Grille, 22f Front wheel, 22r Rear wheel, 26 Operation panel, 28 Floor panel, 30 Front seat, 34 Rear seat, 36 Main frame, 38 Front side member, 39 Rear side member, 40 Center side member, 41a, 41b, 41c Front cross members, 42a, 42b, 42c Rear cross members 43a, 43b, 43, 43d, 43e Center cross members, 44 Through-hole, 45 Suspension tower, 46 Front housing chamber (first housing chamber), 47 Cab mounting bracket, 48 Rear housing chamber (second housing chamber), 50 Main battery, 51 Support bracket, 52 Air-suspension device, 53 Suspension unit, 54 Air spring, 56 Shock absorber, 57 Air piping, 58 Air compressor, 59 Discharge piping, 60 Filter, 62 Drier, 63 Support member, 64 First surge tank, 65 Lid body, 66 Second surge tank, 68a, 68b, 68c Electromagnetic valves, 70 Bracket, 72 Motor unit, 74 Travel-use motor, 76 PCU, 78 Brake driving device

The invention claimed is:

1. An electric vehicle comprising:
a main battery disposed under a floor of a vehicle interior;
a seat provided for a front part or a rear part of said vehicle interior;
a first housing chamber formed under a seating surface of said seat; and
an air-suspension device including an air spring which is made to expand and contract by air pressure, an air compressor which compresses air, one or more first surge tanks which store high-pressure air or low-pressure air, and a second surge tank disposed between said first housing chamber and said main battery under the floor of said vehicle interior,
wherein at least one of said first surge tanks and said air compressor is disposed in said first housing chamber.

2. The electric vehicle according to claim 1, further comprising:
a second housing chamber which is provided on the opposite side of said first housing chamber in a front/rear direction of the vehicle, and in which a motor unit including a travel-use motor and a PCU is disposed.

3. The electric vehicle according to claim 2, further comprising:
a brake driving device which drives a brake by hydraulic pressure, and is disposed in said first housing chamber.

4. The electric vehicle according to claim 1, wherein one or more of said first surge tanks and said air compressor are disposed inside said first housing chamber in an array in a vertical direction of the vehicle.

5. The electric vehicle according to claim 4, wherein said air compressor is disposed under one or more of said first surge tanks.

6. The electric vehicle according to claim 1, wherein two or more of said first surge tanks are disposed in said first housing chamber in an array in a vertical direction of vehicle.

7. The electric vehicle according to claim 1, further comprising:
a seat frame which supports said seat, wherein
an outer end part of said seat frame in a vehicle front/rear direction is positioned outside said one or more first surge tanks and said air compressor in the vehicle front/rear direction, and
said seat frame is overlapped with said one or more first surge tanks and said air compressor in a vehicle width direction.

* * * * *